United States Patent [19]

DeLeo

[11] Patent Number: 4,941,834

[45] Date of Patent: Jul. 17, 1990

[54] UNIVERSAL HIGH VOLTAGE GROUND STUD INSULATING SYSTEM

[76] Inventor: John DeLeo, 107 Sun Valley Dr., Southington, Conn. 06489

[21] Appl. No.: 476,692

[22] Filed: Feb. 8, 1990

[51] Int. Cl.$^5$ .......................... H01R 4/66; H01R 4/70
[52] U.S. Cl. ...................................... 439/92; 439/934; 174/138 F; 361/341
[58] Field of Search ............... 439/92, 94, 367, 521, 439/625, 750, 801, 892, 904, 905, 933, 934; 361/341, 365; 174/5 R, 5 SG, 138 F

[56] References Cited

U.S. PATENT DOCUMENTS

| | | | |
|---|---|---|---|
| 4,744,765 | 5/1988 | DeLeo | 439/92 |
| 4,822,289 | 4/1989 | DeLeo | 439/92 |
| 4,859,192 | 8/1989 | DeLeo | 439/92 |

*Primary Examiner*—Gary F. Paumen

[57] ABSTRACT

An easily removable high voltage ground stud insulating system allows ready access to the ground stud bolt having one end directly attached to a switchgear terminal bus, with the other end adapted to receive a temporary ground connector. A two-part insulative enclosure consisting of a first thermoplastic insulative cylinder is arranged over that part of the ground stud that is adapted for connection with the ground connector while a second insulative cylinder is arranged over the other end. The insulating properties of the thermoplastic material virtually eliminate arcing between the ground stud and the surrounding atmosphere when the switchgear is energized with high voltage. The insulating system is adapted for connection with the ground stud by means of a pair of threaded washers that serve to attach the insulative cylinders on both sides of the ground connector.

9 Claims, 3 Drawing Sheets

UNIVERSAL HIGH VOLTAGE GROUND STUD INSULATING SYSTEM

BACKGROUND OF THE INVENTION

High voltage switchgear, as defined herein, consists of a metallic enclosure containing a plurality of industrial-rated high voltage circuit breakers capable of interrupting currents at applied voltages in excess of 1,000 volts. When the switchgear is de-energized, for inspecting and repairing associated industrial equipment, it is required by state and national electric codes that the switchgear terminal bus be connected directly with ground. In the event that the switchgear is inadvertently energized while such inspection and repair is ongoing, this would prevent serious damage to the personnel, as well as to the associated equipment. To facilitate connecting the terminal bus to ground, a plurality of ground studs are attached to the terminal bus and are electrically insulated from the environment to prevent localized corona discharges from occurring. Electrical connection with the ground studs is made by employing a "hotstick" which generally includes a long insulated handle with means for mechanically manipulating an insulated hook-shaped end. The ground stud insulation generally includes an insulating cylindrical body terminating in an eyelet to facilitate capturing the insulating cylindrical body by the hotstick. The ground connector generally comprises a spring-loaded clamp at one end of a heavy gauge metal flexible conductor that is bolted to the system's ground terminal at an opposite end. U.S. Pat. No. 4,744,765 entitled "High Voltage Ground Stud" describes a ground stud insulator that is screwed onto the threaded end of the ground stud. This Patent is incorporated herein for reference purposes and should be reviewed for a more detailed description of a high voltage switchgear and a ground stud. As described within the aforementioned U.S. Patent, an insulative cylinder, terminating in an eyelet, is threaded onto the ground stud in the same manner as for the high voltage studs. A separate insulative cap is threaded onto the threaded part of the ground stud that extends through the terminal bus to prevent localized corona from otherwise occurring with exposed metal parts at voltages in excess of 1000 volts. To access the ground stud, the hooked end of the hotstick is inserted through the eyelet at the end of the insulative enclosure to unscrew the insulative cylinder from the protected ground stud. Using the same hotstick, the ground conductor is attached to the exposed ground stud by means of a spring-loaded ground clamp. Before energizing the high voltage switchgear, the procedure is reversed and the ground connector clamp is removed. The insulative cylinder is positioned over the exposed ground stud and is threaded onto the exposed ground stud threads. In some instances, it is important to rapidly expose and ground the ground stud without having to take the time required to unscrew the insulative cylinder from the ground stud to expose the threaded end of the ground stud.

U.S. Pat. No. 4,822,289 describes an easily removable high voltage ground stud insulator wherein a two-part insulating arrangement is employed. The first insulative part is arranged over one end of the ground stud without attachment to allow immediate removal. The other insulative part is threadingly attached directly to the opposing threaded end of the ground stud.

Some switch gear terminal bus designs require attachment between both of the insulative parts and both ends of the ground stud. This is difficult to arrange because of the wide variations in the length and diameter of various ground stud configurations which, in turn, require similar variations in the insulative parts to meet the design requirements.

One purpose of this invention accordingly is to provide a two-part insulating system for ground studs whereby the two insulative parts are of common diameter and thread size to accommodate a wide variety of ground stud dimensions.

SUMMARY OF THE INVENTION

A two-part insulative enclosure is used to protect a high voltage ground stud from atmospheric conditions and to prevent the occurrence of a localized corona discharge. One end of the ground stud is fastened to the switchgear terminal bus by means of a threaded shank and a nut. The threaded shank extends through a pair of externally threaded bushings arranged on either side of the terminal bus, which in turn, become attached to corresponding internally threaded insulative cylinders one of which is integrally provided with an eyelet to facilitate use of a hotstick for ease in removal.

DESCRIPTION OF THE PREFERRED EMBODIMENT

Figure 1:
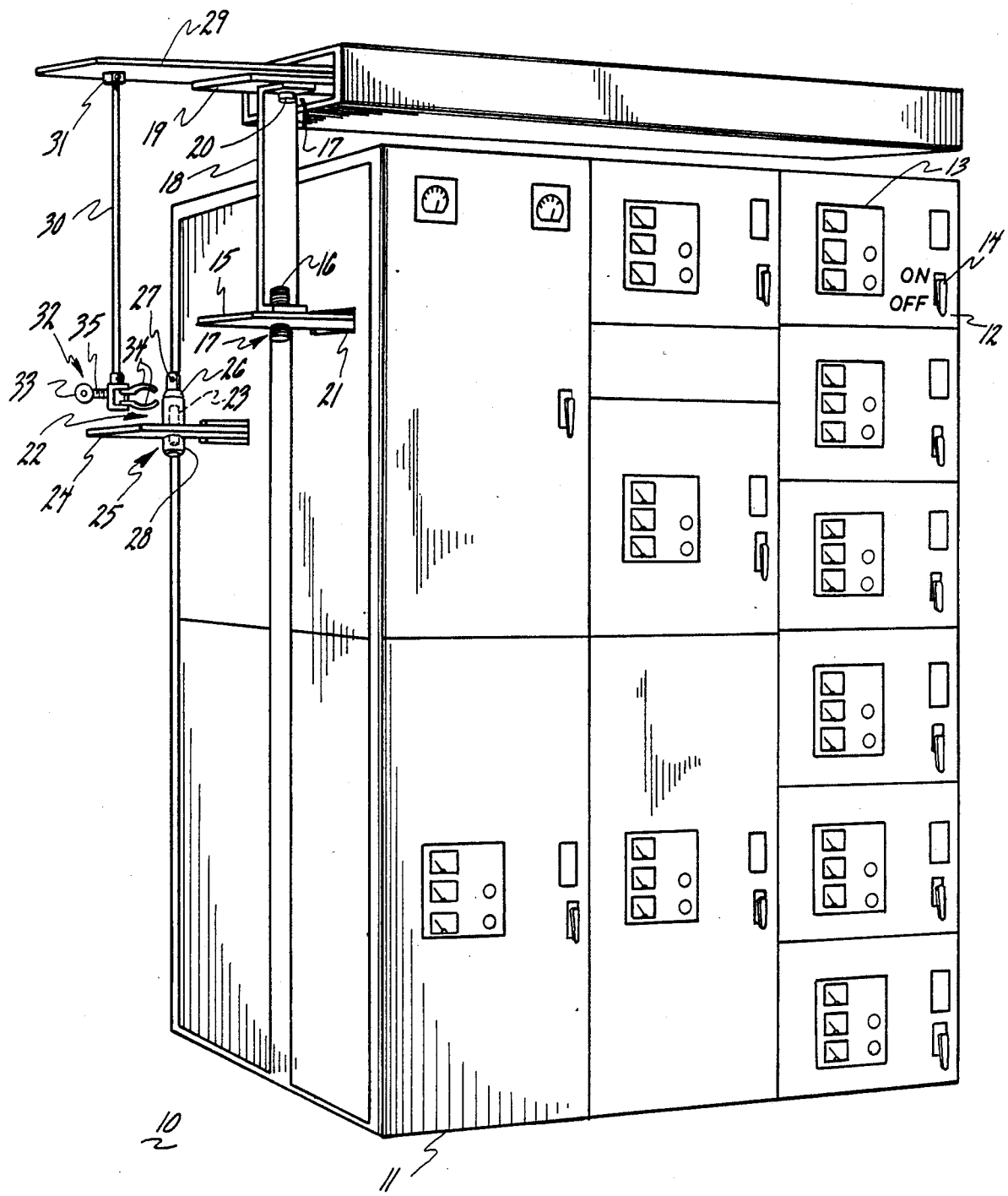
FIG. 1 is a front perspective view of a high voltage switch gear assembly employing the universal ground stud insulating system according to the invention.

A high voltage switchgear assembly 10, as depicted in FIG. 1, includes a cabinet 11 containing a plurality of compartments 12 which contain a circuit breaker generally indicated at 13 to which operable access is made by means of a handle 14. For purposes of this disclosure, high voltage switchgear is defined as switchgear connected with a voltage source in excess of 1,000 volts. To supply the switchgear cabinet, a load terminal bus 15 connects from a line terminal lug 16 over a bus conductor 18 to the busway 19 and is connected to the busway by means of a lug 20. To prevent a localized corona discharge, electrical tape, generally indicated at 17, is applied to both the load terminal bus lug 16, and busway lug 20. The load terminal bus egresses from the cabinet 11 through an aperture 21, as indicated. For a three-phase power system, as is commonly employed with industrial type operations, a separate line terminal bus is connected within each separate phase although only one such terminal bus 15 is shown herein for purposes of clarity. A ground stud assembly 22, which includes a ground stud 23 connected to a separate load terminal bus 24, is also connected within the high voltage switchgear. The universal ground stud insulating system 25 consists of a first insulative part 26 arranged over the ground stud on one side of the load terminal bus 24. An eyelet 27 is formed within the first insulative part 26 to facilitate the use of a "hotstick" by the operator, as earlier described. A second insulative part 28 is attached to the ground stud on the opposite side of the load terminal bus to prevent the formation of a corona discharge when the load terminal bus is energized. When the switchgear is de-energized, by turning the circuit breaker handles 14 to their "OFF" position, no voltage should appear on the load terminal bus. To ensure that the load terminal bus remains de-energized and to prevent inadvertent damage to equipment and personnel, a systems ground bus 29 and ground conductor 30, which is attached to the ground bus at one end by means of a lug 31, is employed in the following manner. The hotstick (not shown) engages the eyelet 27, formed in the top of the insulative part 26, and unscrews the part from the ground stud 23. The releaseable clamp connector 32, attached to the opposite end of the ground conductor 30, is then grasped by engaging the eyelet 33 at the end of the clamp connector with the hotstick and clasping the jaws 34 around the ground stud 23. The jaws are spring-loaded together by means of a spring 35, such that when the hotstick is released from the eyelet, the spring holds the jaws in good electrical connection with the ground stud. In the event that the circuit breakers 13 within the switchgear cabinet 11 are inadvertently turned to their "ON" position, any voltage appearing on the load terminal bus 15 will immediately drop to ground potential.

Figure 2B:
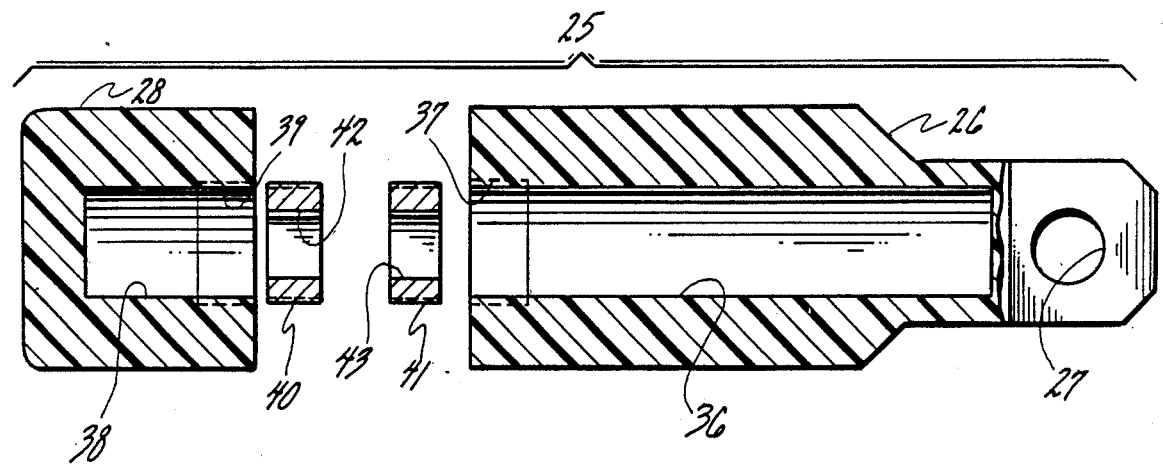
FIG. 2B is a side sectional view of the two-part insulative enclosure within the ground stud insulating system of FIG. 1.
Figure 2A:
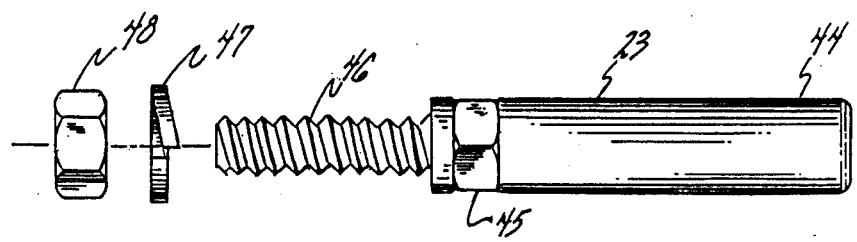
FIG. 2A is a side view of the ground stud within the ground stud insulating system of FIG. 1.
Figure 3:
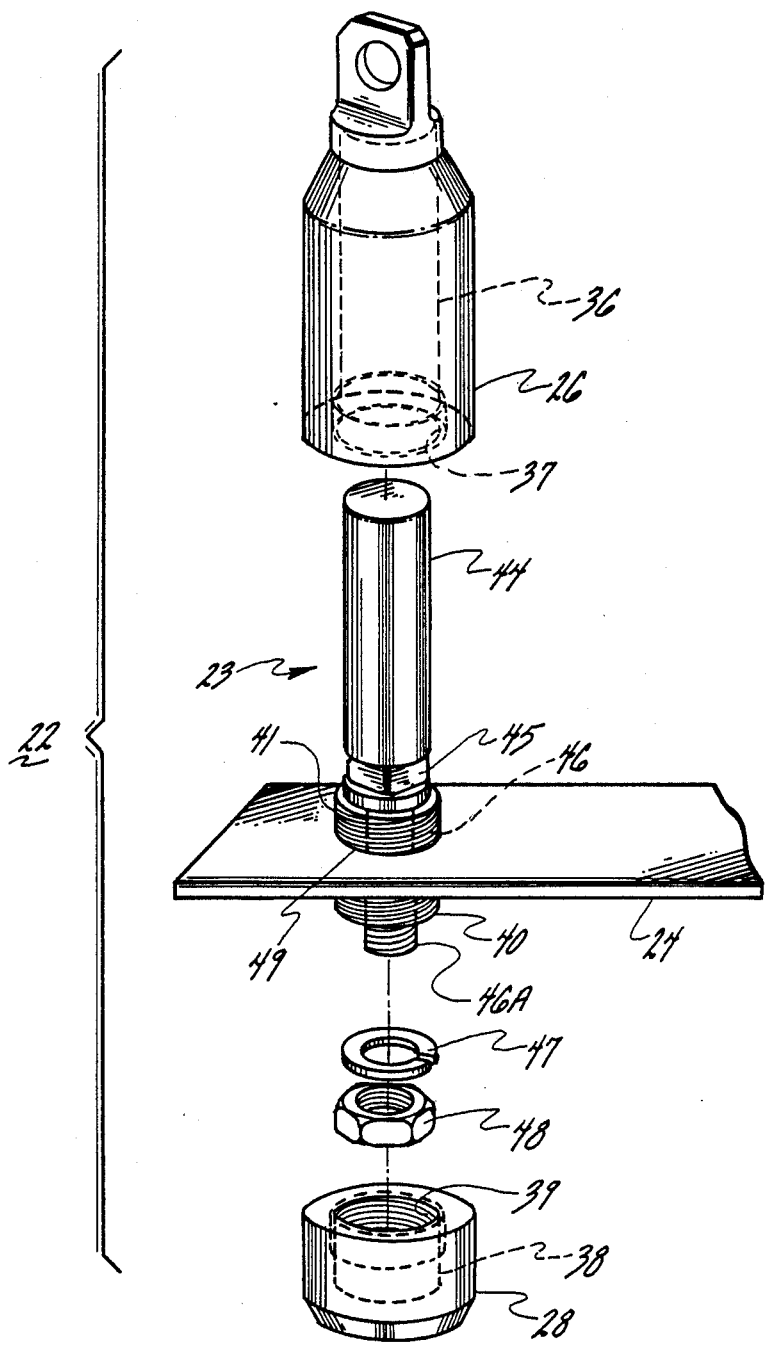
FIG. 3 is an enlarged top perspective view of the ground stud insulating system of FIG. 1 in isometric projection from the switch gear load bus conductor.

The ground stud 23 shown in FIG. 2A is shaped from a copper, steel, aluminum or brass bar and formed into a long cylindrical end 44 and an extended threaded shank part 46. A hex-shaped part 45 is formed in the ground stud between both parts to facilitate the use of a wrench when fastening the ground stud to the load terminal bus. A lock washer 47 and bolt 48 are employed to fasten both the ground stud and the ground stud insulating system 25, shown in FIG. 2B to the load terminal bus. The ground stud insulating system includes a first insulated part 26 formed from a thermoplastic cylinder with an eyelet 27 formed in one end for engagement with the hotstick, described earlier. An extended channel 36 is formed along the interior of the first insulative part to receive the cylindrical end of the ground stud in a manner to be described below in greater detail. A first externally threaded metal washer 41 includes an aperture 43 for receiving the threaded shank portion of the ground stud on one side of the load terminal bus. A second threaded washer 40 includes a similar aperture 42 for receiving the threaded shank on the opposite side of the load terminal bus. A second insulative part 28 used with the ground insulative system includes a hollow channel 38 for receiving the bolt, lock washer and the end of the threaded shank. A thread 39 formed at the end of the channel 38 engages the threaded washer 40 in the manner best seen by referring now to the complete ground stud assembly 22 depicted in FIG. 3.

The ground stud 23 is first fastened to the load terminal bus 24 by passing the threaded shank 46 through the first threaded washer 41 and then through the aperture 49 formed within the load terminal bus. The hex-shaped part 45 is placed against the threaded washer and holds the washer in place while the other threaded washer 40 is arranged over the part of the threaded shank that extends through the load terminal bus. The lock washer 47 is placed against the threaded washer 40 and the bolt 48 is fastened to the end of the threaded shank. With the ground stud 23 and threaded washers 40, 41 fastened to the load terminal bus, the first and second insulative parts 26, 28 are attached in the following manner. The first insulative part 26 is placed over the cylindrical end 44 of the ground stud and is received within the elongated channel 36 formed within the first insulative part. The threads 37 are then screwed onto the threaded washer 41. The end 46A of the threaded shank 46, the lock washer 47 and bolt 48 are received within the channel 38 formed within the second insulative part 28 when the second insulative part is screwed onto the threaded washer 40 by means of threads 39. Rapid access to the ground stud can thereby be made by merely unscrewing the first insulative part 26 and connecting the ground attachment with the cylindrical end 44 as described earlier with reference to FIG. 1.

A universal high voltage ground stud insulating system has herein been described wherein the ground stud attachment means also includes a pair of threaded washers arranged on opposite sides of the load terminal bus. Internally threaded ground stud insulators are then fastened to the threaded washers to deter the occurrence of corona discharge when the load terminal bus is energized.

Having thus described my invention, what I claim as new and desire to secure by Letters Patent is:

1. A universal ground stud insulating system comprising in combination:
   a first insulative cylinder having a first hollow channel at least part way along an interior of said first cylinder, said first channel terminating at one end having first internal threads formed therein;
   a second insulative cylinder having a second hollow channel at least part way along an interior of said second cylinder, said second channel terminating at one end having second internal threads formed therein;
   a first washer having threads formed on an exterior surface thereof and arranged for engaging said first cylinder threads; and
   a second washer having threads formed on an exterior surface thereof and arranged for engaging said second cylinder threads.

2. The ground stud insulating system of claim 1 including a metallic ground stud having a cylindrical body part for receiving a ground clamp and a threaded shank part for fastening to an apertured power bus.

3. The ground stud insulating system of claim 2 wherein said cylindrical body part is inserted within said first channel thereby providing electrical isolation of said body part.

4. The ground stud insulating system of claim 2 wherein said threaded shank is inserted within said second channel thereby providing electrical isolation of said shank part.

5. The ground stud insulating system of claim 2 wherein said first washer is arranged on one side of said power bus and said second washer is arranged on an opposite side thereof, said ground stud shank being inserted through said first and second washers and said power bus aperture.

6. The ground stud insulating system of claim 5 including a nut fastened to said shank on said opposite side of said power bus.

7. The ground stud insulating system of claim 1 wherein said first and second cylinders comprise thermoplastic material.

8. The ground stud insulating system of claim 2 wherein said ground stud is comprised of copper, steel, aluminum or brass.

9. A method of insulating ground studs on high voltage switchgear comprising the steps of:
   providing a ground stud having a ground clamp receiving part at one end and an extended threaded shank part at an opposite end;
   arranging a pair of externally threaded washers, one on either side of an electric switchgear power bus;
   inserting said threaded shank part, through said spacers and an aperture in said power bus and attaching said shank part to said power bus by means of a nut;
   arranging a first hollow insulative cylinder over said ground clamp receiving part and threading said first cylinder to one of said threaded washer on one side of said power bus; and
   arranging a second hollow insulative cylinder over said threaded shank port on an opposite side of said power bus and threading said second cylinder to another of said threaded washers on an opposite side of said power bus.

* * * * *